Patented Sept. 26, 1933

1,927,867

UNITED STATES PATENT OFFICE 1,927,867

DRIER FOR OILS

Herman Alexander Bruson, Philadelphia, Pa.

No Drawing. Application July 27, 1929
Serial No. 381,682

19 Claims. (Cl. 134—57)

My invention relates to driers for oils, paints and varnishes and has for its object the provision of a group of compounds which are very efficient for this purpose. A great many of the members of this group are well known but have never been used for this purpose. There are several, however, that have never been prepared before and it is a further object of my invention to provide a simple process for preparing such new compounds.

I have found that the heavy metal salts, and in particular, the manganese, cobalt and lead salts of a benzoic acid, at least one nuclear hydrogen atom of which is replaced by a hydrocarbon radicle, are strikingly effective as driers for oils, paints and varnishes. The metals used for the formation of these salts are polyvalent metals. These substituted benzoic acids include such substances as toluic acid, propyl benzoic acid, isopropyl benzoic acid, butyl benzoic acid (ortho-, meta- and para-), mesitylenic acid, phenyl benzoic acid (ortho-meta- and para-), naphthoic acid ($\alpha$ and $\beta$) and their derivatives, that is, those compounds in which at least one hydrogen of the hydrocarbon substituent is replaced by an organic group which may be either an alkyl or an aryl group.

I have found that very good results are obtainable with the heavy metal salts of the toluic acids and their derivatives, wherein at least one hydrogen atom of the methyl group is replaced by an organic group, as for example, P-xylyl-ortho-benzoic acid 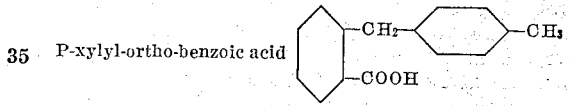

Naphthyl methylene-ortho-benzoic acid

Perhydro-para-xylyl-ortho-benzoic acid

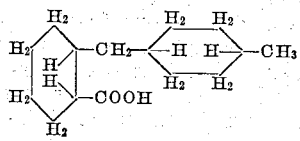

Perhydro-alpha-naphthyl methylene-ortho benzoic acid

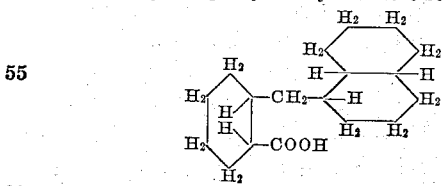

According to my invention these derivatives of toluic acids are prepared by the reduction of organic derivatives of keto-benzoic acids, which in turn are prepared by condensing practically any organic group or compound containing a replaceable hydrogen with phthalic anhydride in the presence of anhydrous aluminium chloride and hydrolyzing the resulting product.

As starting materials I may use organic derivatives of ortho-, meta-, or para-keto-benzoic acids wherein the carbon atom of the keto group is linked directly to a carbon atom of an organic radicle. Because of the difficulty encountered in obtaining the para- and meta-keto-benzoic acids, however, I prefer to practice my invention chiefly with the ortho-keto-benzoic acid which has the general structure

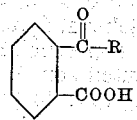

wherein R represents an organic group or radicle, a carbon atom of which is directly linked with the carbon atom of the keto group.

Practically any organic group or compound containing a replaceable hydrogen can be linked with the carbon atom of the keto group by condensing said compound with phthalic anhydride or its chloro-, nitro-, alkyl, aryl, or nuclear hydrogenated derivatives in the presence of anhydrous aluminium chloride. The condensation product so produced is then hydrolyzed to form the fundamental body illustrated by the structural formula shown above.

The group or radicle represented by R may be an alkyl group or an aryl group, which term includes polynuclear as well as mononuclear aromatic groups and their chloro-, nitro-, hydroxy, alkyl, aryl, or nuclear hydrogenated derivatives or their ethers. The best results, insofar as the drying of oils, paints and varnishes is concerned, have been produced, generally speaking, with the heavy metal salts of compounds of the above mentioned general structure in which R represents a mononuclear aromatic group preferably substituted by alkyl groups. When R represents an aromatic group whether it be mononuclear or polynuclear, the introduction of halogen, hydrogen, or alkyl groups into either the nucleus of the phthalic anhydride or the nucleus of the side chain, produces an increase in oil solubility.

In carrying out my invention, I have extended my investigations to the heavy metal salts of the reduction products of derivatives of keto-benzoic acids

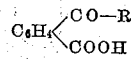

which may be classified in four groups as follows:

1. Those derivatives in which R represents an alkyl group such as methyl, ethyl, butyl, propyl, isopropyl, amyl etc., in which the keto group is in the ortho, meta, or para position and in which the phthalic anhydride nucleus is substituted by halogens, nitro groups, alkyl groups or hydrogen or unsubstituted.

2. Those derivatives in which R represents a simple benzene ring and its derivatives, such as benzene, toluene, ethyl benzene, propyl benzene, isopropyl benzene, cymene, dimethyl benzene (xylenes), butyl benzene, amyl benzene, chlorobenzene, dichloro-benzene (o, m and p) cyclohexane, methyl-cyclohexane, hexa-ethyl benzene and cyclohexene, wherein the phthalic anhydride nucleus is substituted or unsubstituted and wherein the keto group is in the ortho, meta, or para position to the carboxyl group.

3. Those derivatives in which R represents a polynuclear aromatic group and its derivatives such as naphthalene, chlor-naphthalene, methyl, ethyl and isopropyl naphthalene, tetrahydronaphthalene, decahydronaphthalene, anthracene, diphenyl, phenanthrene, dinaphthyl, ditolyl, retene, perylene, and their aliphatic or halogen substituted derivatives, wherein the phthalic anhydride nucleus is either substituted or unsubstituted and wherein the keto group is in the ortho, meta, or para position to the carboxyl group.

4. Those derivatives in which R represents a mixed system such as diphenyl oxide, diphenylene oxide, carbazole, anisole, phenetole, dibenzyl ether, diphenyl methane, dinaphthyl ether, dibenzyl, ditolyl, dinaphthylene oxide, acenapthene, fluorene, chrysene, hydrindene, picene, stilbene, pinene, dipentene and their aliphatic or their halogen substituted derivatives, wherein the phthalic anhydride nucleus is either substituted or unsubstituted and wherein the keto group is in the ortho, meta or para position to the carboxyl group.

The reduction proceeds very readily but the degree of reduction varies with the reducing agents used. For example, when the reduction is carried out with zinc dust and ammonia, the keto group is reduced to a $CH_2$ group and the remainder of the molecule is unchanged, as, for example:

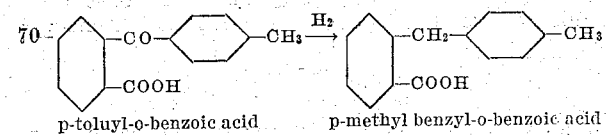

p-toluyl-o-benzoic acid    p-methyl benzyl-o-benzoic acid

When, however, the reduction is carried out with hydrogen gas in the presence of platinum, the hydrogen first saturates the side chain and then reduces the keto group to a $CH_2$ group as follows:

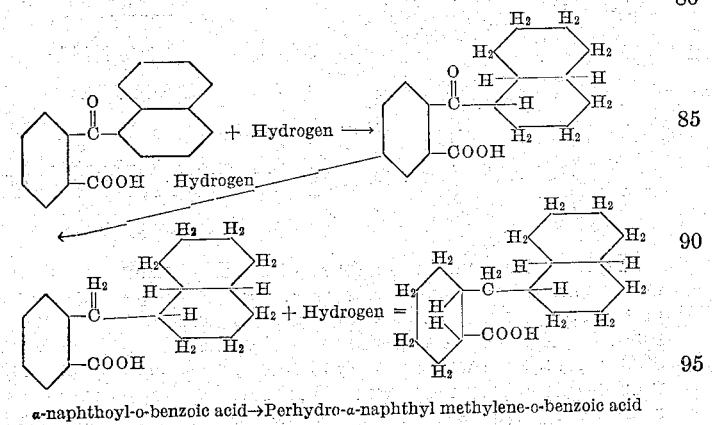

α-naphthoyl-o-benzoic acid→Perhydro-α-naphthyl methylene-o-benzoic acid

These latter reduction products will be referred to hereinafter as hydrogenated benzoic acids, in which at least one nuclear hydrogen atom has been replaced by an organic aliphatic or aromatic radicle, it being understood that the benzene nucleus or/and the side chain may be hydrogenated.

The heavy metal salts of the synthetic acids, enumerated above, are prepared by double decomposition of the water soluble sodium or potassium salts of the latter with a water soluble salt of the heavy metal that is desired in the drier, such as, for example, the chloride, sulphate, nitrate or acetate of cobalt or manganese, or with the nitrate or acetate of lead. In cases where the heavy metal salt of the synthetic acid is so soluble in water that its recovery from a water solution is difficult, it may be preferable to prepare the salts by fusion of the heavy metal oxide, hydroxide or carbonate with the synthetic acid.

The incorporation of the heavy metal salts of synthetic acids prepared according to my invention in oils, may be accomplished in various ways. In some cases the salts are soluble in the oils at ordinary temperatures. In a great many cases, however, it is necessary to heat the oils moderately in order to dissolve the salts. In such cases the salts do not separate out when the oil is cooled to normal temperatures or on long standing. A few of the salts will not dissolve in the oils even at elevated temperatures. Such salts, however, are soluble in aromatic hydrocarbons. Solutions of these salts in aromatic hydrocarbons are miscible with oils without any separation of the salts from the solution.

The following are specific examples of the method of preparing heavy metal salts of the type described and quick drying oils, paints and varnishes obtained by the incorporation of said salts. These examples are purely illustrative and are intended to define the nature of my invention rather than its scope.

*Example 1*

10 parts of p-xylyl-ortho-benzoic acid

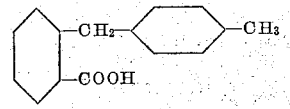

such as is obtained by the reduction of para-toluyl-o-benzoic acid with zinc and ammonia (Gresly, Annalen der Chemie, 234, 236) is suspended in 100 parts of water and exactly neutralized with sodium hydroxide. The clear solution of the sodium salt thus obtained is then treated with an excess of cobaltous sulfate solution whereupon a heavy precipitate is obtained. Filter, wash, and dry. A blue powder is formed which is soluble in benzene, butyl acetate, acetone, hot linseed oil and other drying oils in which it behaves as a drier.

The manganese salt obtained by using manganous chloride as above, is a white powder which disperses readily in hot linseed oil, tung oil, perilla oil and other drying oils.

The lead salt, prepared by using excess lead acetate solution as above, behaves similarly.

*Example 2*

10 parts of alpha naphthyl methylene-ortho-benzoic acid

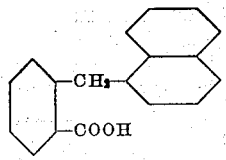

such as is obtained by reducing naphthoyl-ortho-benzoic acid with zinc and ammonia, are suspended in water and neutralized with sodium hydroxide. By adding cobaltous sulfate, manganous chloride, or lead acetate solution, the corresponding heavy metal salts are precipitated. After being washed and dried these salts may be used as driers in oils, being soluble in warm linseed oil, tung oil and the like.

*Example 3*

10 parts of perhydro-para-xylyl-ortho-benzoic acid

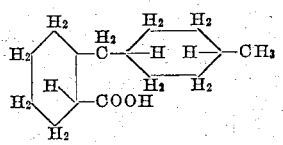

such as is obtained by the reduction of para-xyloyl-o-benzoic acid with hydrogen in the presence of platinum is neutralized with sodium hydroxide solution and its cobalt, manganese, and lead salts prepared by double decomposition, as described above. These salts are soluble in linseed oil, tung oil and other drying oils and act as driers therein.

*Example 4*

Perhydro-naphthyl methylene-ortho benzoic acid,

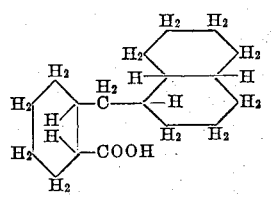

such as is obtained by reducing naphthoyl-o-benzoic acid with hydrogen and platinum, (Willstaetter, Ber. der Deutschen Chem. Ges. 54, 1420) when converted into its cobalt, manganese, and lead salts as described above, gives oil soluble compounds which are efficient driers for oils such as linseed, tung, perilla, soya bean, and the like.

The heavy metal salts of this acid have heretofore been prepared by Willstaetter (above reference) but their solubility in drying oils and their drying action therein, is new.

I have found that the other heavy metal salts of these acids and others of the same class, enumerated above, are also soluble in fatty oils. These include the zinc, aluminium, chromium, iron, vanadium, cadmium, tin, nickel and copper salts.

For the drying of oils, the quantity of salt to be added depends upon the metallic content and the nature of the metal present. In general from .01–0.05% of cobalt or manganese or 0.2% of lead relative to the weight of the oil is sufficient. The salts are best incorporated by heating the oil to about 450° F. and sprinkling the finely powdered material therein.

I have found that the solubility of these salts in oils is greatly dependent upon the nature of the group R. In general the introduction of alkyl groups or of hydrogen in R or in the benzoic acid nucleus gives increased oil solubility.

The simple alkyl or aryl substituted benzoic acids such as ortho-toluic acid, para-ethyl benzoic acid and phenyl benzoic acid, yield heavy metal salts which are not quite as readily incorporated in hot drying oils as are those heavy metal salts derived from the substituted toluic acids, examples of which are given above.

The introduction into linseed oil of .05% cobalt in the form of cobalt-para-xylyl-ortho-benzoate cuts down the drying time from 18 hours to 4 hours.

The advantage of using these salts in oils, instead of the heavy metal salts at present employed in the art, such as the rosinates, acetates, borates, and linoleates, is that lighter colored varnishes and oil compositions may be obtained from the former.

It is of course apparent to those skilled in the art that not only drying oils, but also fatty acids derived from such such oils, as well as resinous products derived therefrom, such as oil varnishes, paints, synthetic resins, and the like may be dried at an accelerated rate by incorporating therein any of the driers described above.

Having thus described my invention and illustrated several embodiments of the practical application thereof, what I claim as new and desire to secure by Letters Patent is:—

1. A method for accelerating the drying of oxidizable oils and of paints, varnishes, and resin compositions derived therefrom, which comprises incorporating therein, as a siccative, a polyvalent metal salt of a toluic acid in which one hydrogen atom of the methyl group is replaced by a hydrocarbon radicle.

2. A method for accelerating the drying of oxidizable oils and of paints, varnishes, and resin compositions derived therefrom which comprises incorporating therein, as a siccative, a polyvalent metal salt of a toluic acid in which one hydrogen atom of the methyl group is replaced by an aliphatic hydrocarbon radicle.

3. A method for accelerating the drying of oxidizable oils and of paints, varnishes, and resin compositions derived therefrom, which comprises incorporating therein, as a siccative, a polyvalent metal salt of a toluic acid in which one hydrogen atom of the methyl group is replaced by an aryl group.

4. A method for accelerating the drying of oxidizable oils and of paints, varnishes and resin compositions derived therefrom, which comprises incorporating therein, as a siccative, a polyvalent metal salt of a toluic acid in which one hydrogen atom of the methyl group is replaced by an aralkyl group.

5. A method for drying oxidizable oil compositions as set forth in claim 1 in which the metal salt used is one of the group consisting of lead, cobalt and manganese salts and mixtures of such salts.

6. A method for drying oxidizable oil compositions as set forth in claim 2 in which the metal salt used is one of the group consisting of lead, cobalt and manganese salts and mixtures of such salts.

7. A method for drying oxidizable oil compositions as set forth in claim 3 in which the metal salt used is one of the group consisting of lead, cobalt and manganese salts and mixtures of such salts.

8. A method for drying oxidizable oil compositions as set forth in claim 4 in which the metal salt used is one of the group consisting of lead, cobalt and manganese salts and mixtures of such salts.

9. A method for accelerating the drying of oxidizable oils, and of paints, varnishes and resin compositions derived therefrom which comprises incorporating therein, as a siccative, a polyvalent metal salt of a member selected from the group consisting of butylbenzoic acid, amylbenzoic acid, benzylbenzoic acid, naphthyl-methylene-benzoic acid and their homologues and nuclear hydrogenated derivatives.

10. A method for accelerating the drying of oxidizable oils, and of paints, varnishes and resin compositions derived therefrom which comprises incorporating therein, as a siccative, a salt of amylbenzoic acid in which the metal radicle is a member selected from the group consisting of lead, cobalt, and manganese.

11. A composition of matter comprising a substance selected from the group consisting of oxidizable oils, paints and varnishes derived therefrom and oxidizable resins and a polyvalent metal salt of a toluic acid in which one hydrogen atom of the methyl group is replaced by a hydrocarbon radicle.

12. A composition of matter comprising a substance selected from the group consisting of oxidizable oils, paints and varnishes derived therefrom and oxidizable resins and a polyvalent metal salt of a toluic acid in which one hydrogen atom of the methyl group is replaced by an aliphatic hydrocarbon radicle.

13. A composition of matter comprising a substance selected from the group consisting of oxidizable oils, paints and varnishes derived therefrom and oxidizable resins and a polyvalent metal salt of a toluic acid in which one hydrogen atom of the methyl group is replaced by an aryl group.

14. A composition of matter comprising a substance selected from the group consisting of oxidizable oils, paints and varnishes derived therefrom and oxidizable resins and a polyvalent metal salt of a toluic acid in which one hydrogen atom of the methyl group is replaced by an aralkyl group.

15. A composition of matter comprising a substance selected from the group consisting of oxidizable oils, paints and varnishes derived therefrom and oxidizable resins and a polyvalent metal salt of a member selected from the group consisting of butylbenzoic acid, amylbenzoic acid, benzylbenzoic acid, naphthyl-methylene-benzoic acid and the homologues and nuclear hydrogenated derivatives thereof.

16. A composition of matter as set forth in claim 11 in which the polyvalent metal is one selected from the group consisting of lead, cobalt and manganese.

17. A composition of matter as set forth in claim 15 in which the polyvalent metal is one selected from the group consisting of lead, cobalt and manganese.

18. A method for accelerating the drying of oxidizable oils and of paints, varnishes and resin compositions derived therefrom, which comprises incorporating therein, as a siccative, a polyvalent metal salt of a toluic acid in which one hydrogen atom of the methyl group is replaced by an aralkyl group and in which said polyvalent metal is one selected from the class consisting of cobalt and manganese.

19. A composition of matter comprising a polyvalent metal salt of a toluic acid in which one hydrogen atom of the methyl group is replaced by an aralkyl group and in which the polyvalent metal is one selected from the class consisting of cobalt and manganese, and a substance selected from the group consisting of oxidizable oils, paints and varnishes derived therefrom and oxidizable resins.

HERMAN ALEXANDER BRUSON.